Jan. 2, 1968  L. F. STREET  3,361,263
AUTOMATIC SCREENING HEAD FOR EXTRUDERS
Filed June 10, 1965  5 Sheets-Sheet 1
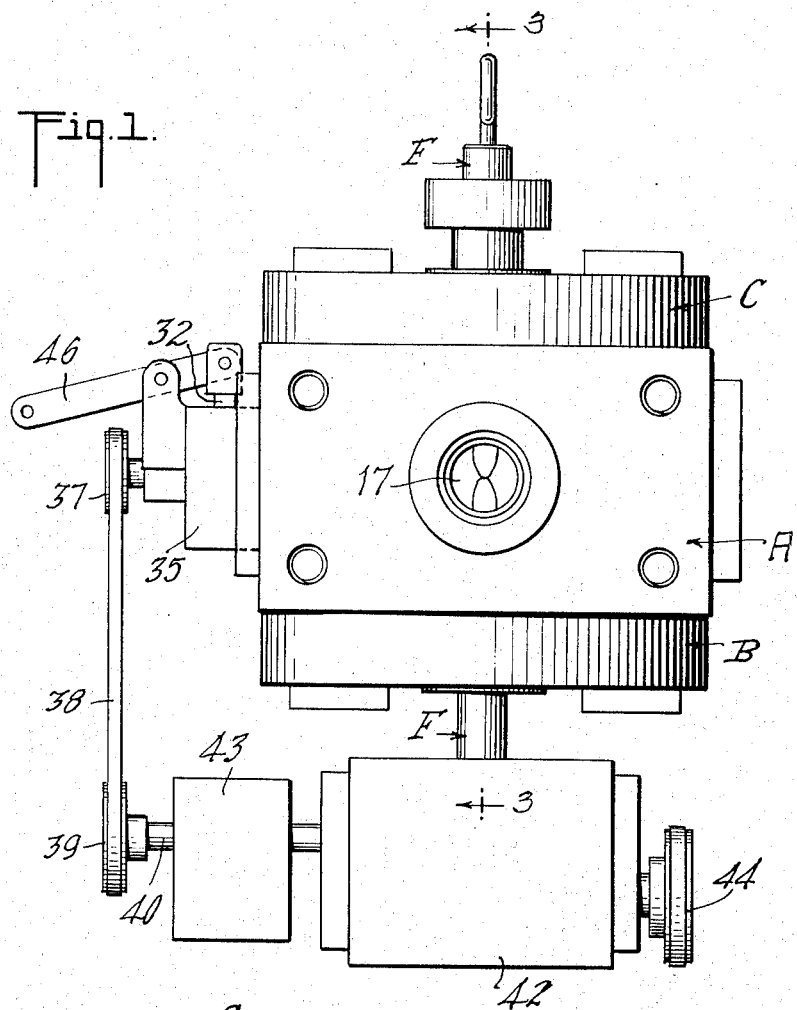
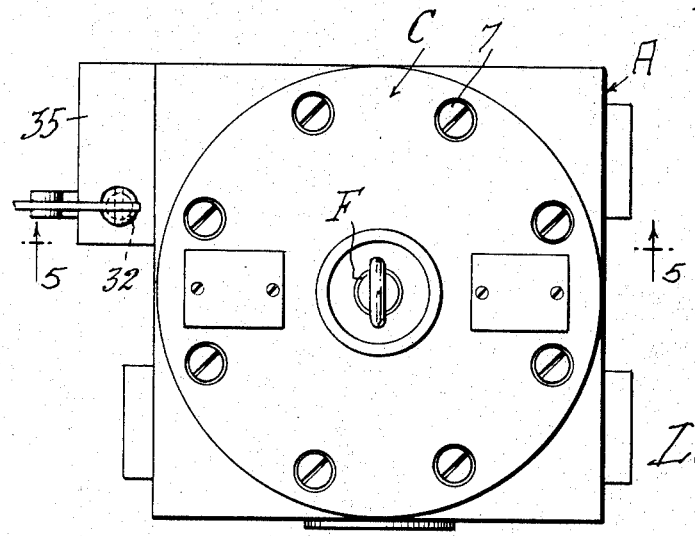
INVENTOR.
Louis F. Street,
BY
ATTORNEY

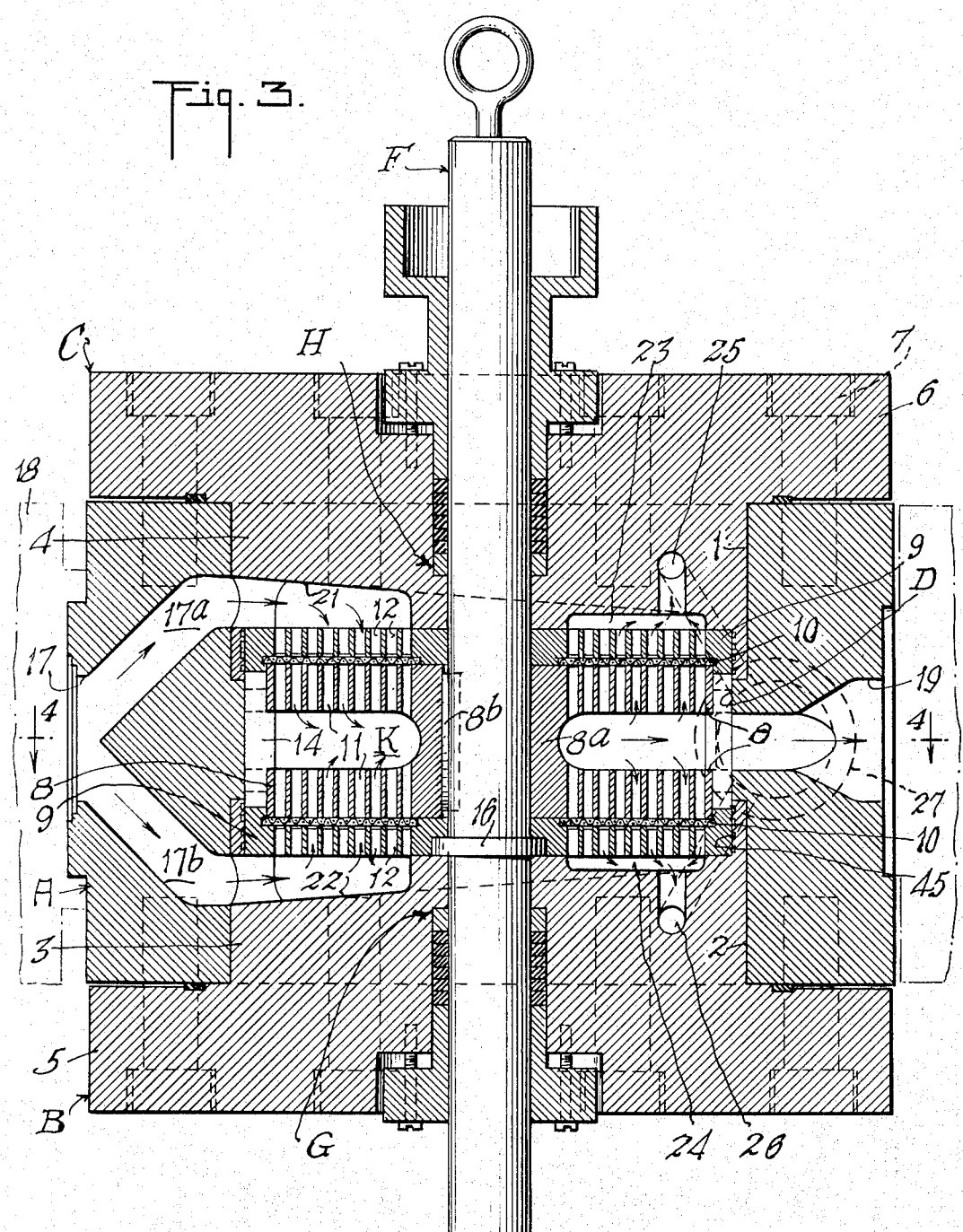

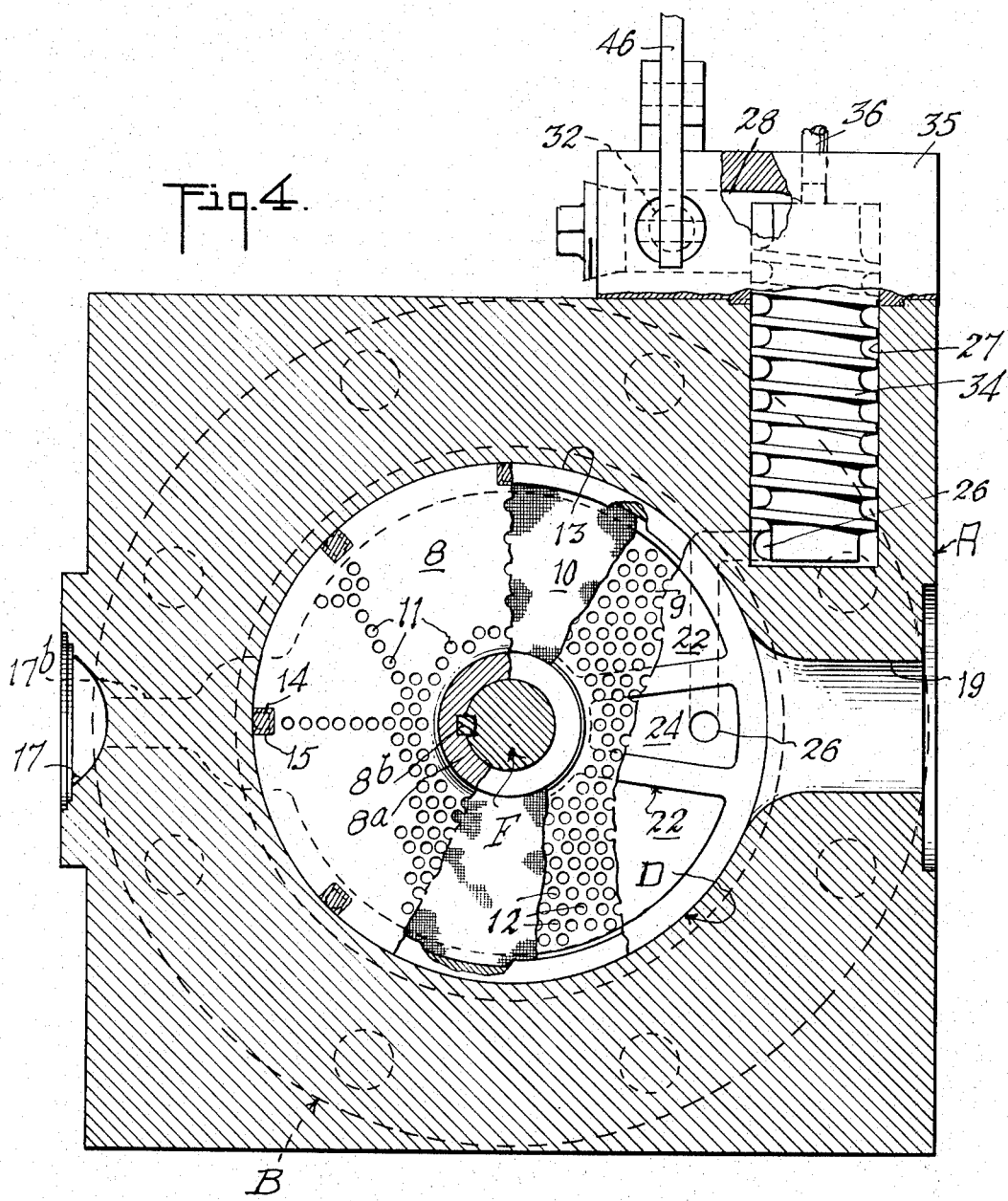

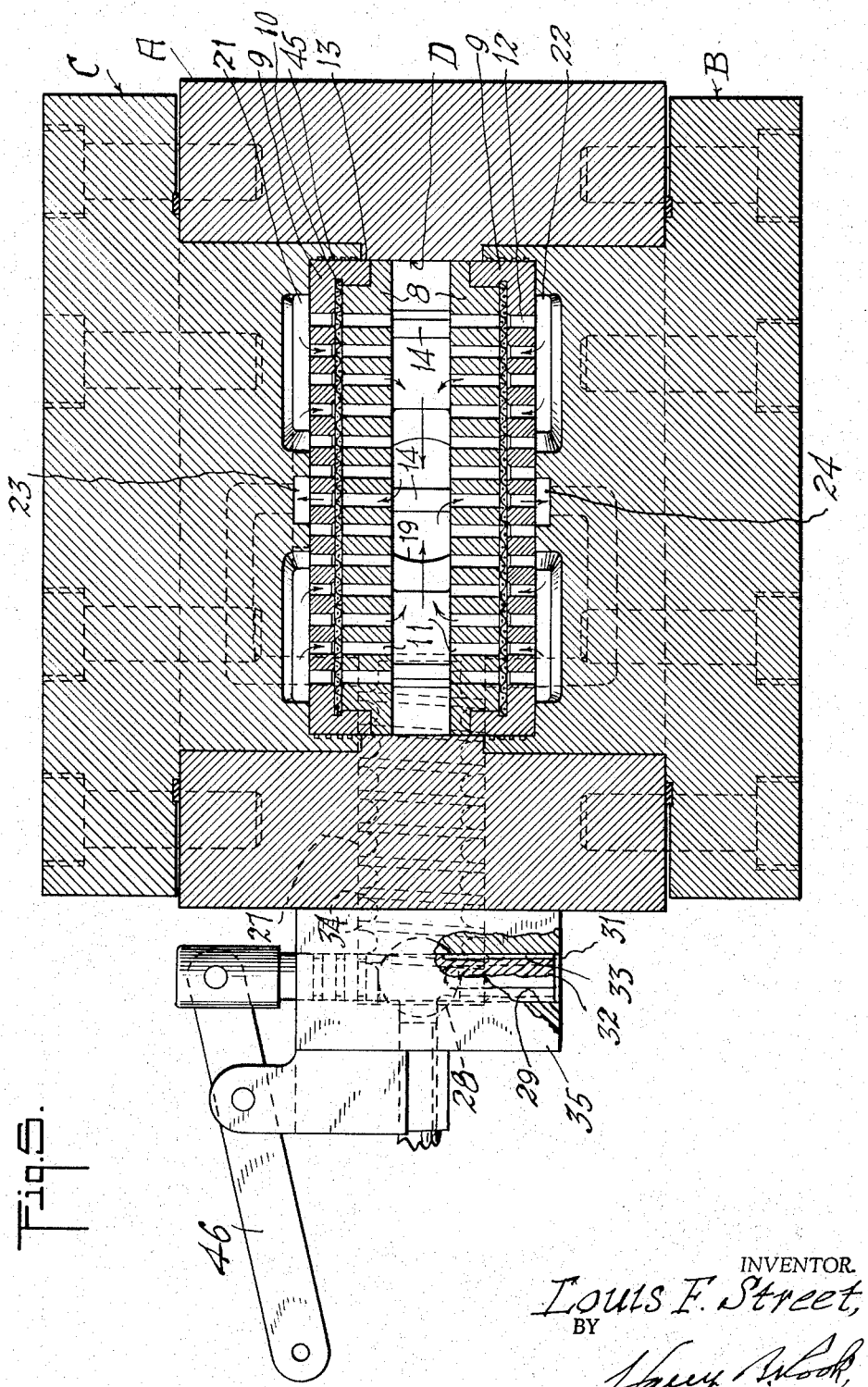

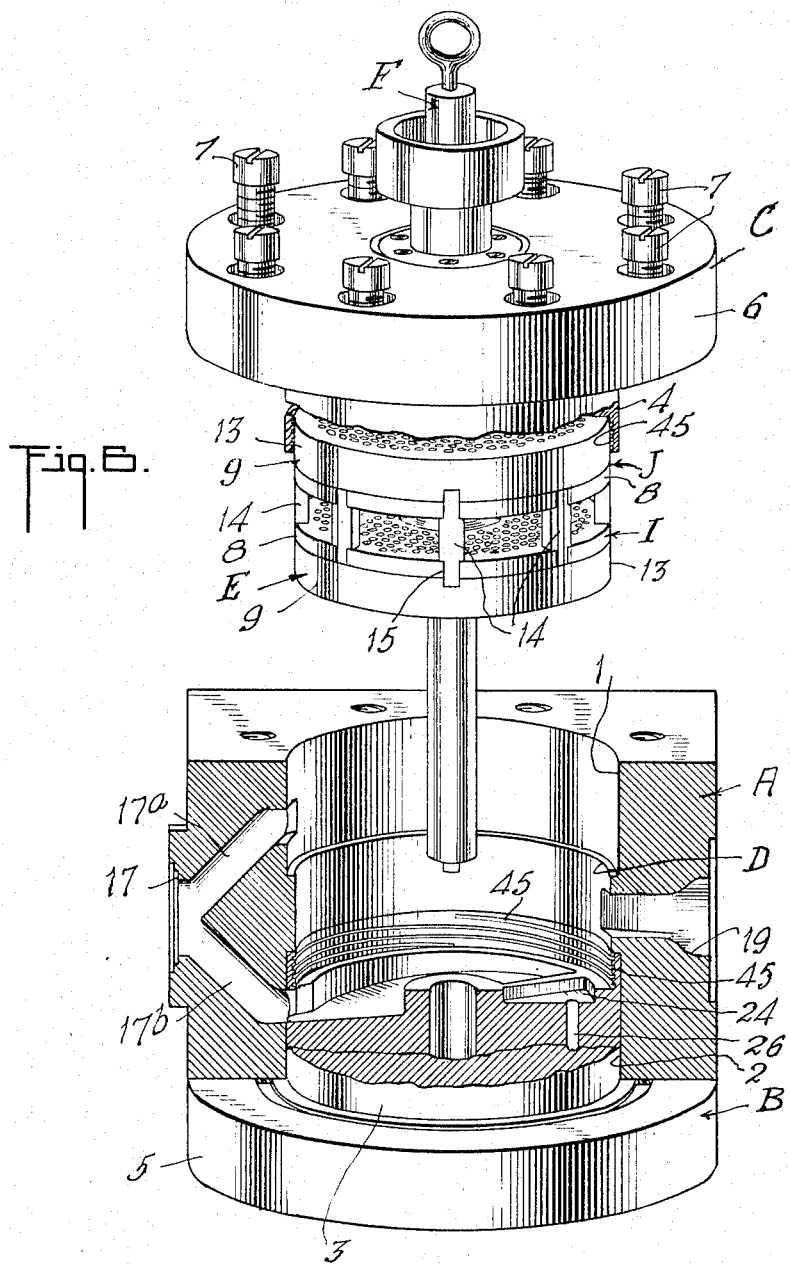
Fig. B.
INVENTOR.
Louis F. Street,
BY
Harry B. Rook,
ATTORNEY

United States Patent Office 3,361,263
Patented Jan. 2, 1968

3,361,263
AUTOMATIC SCREENING HEAD FOR EXTRUDERS
Louis F. Street, Hampton, N.J., assignor to Frank W. Egan & Company, Somerville, N.J., a corporation of New Jersey
Filed June 10, 1965, Ser. No. 462,974
2 Claims. (Cl. 210—332)

ABSTRACT OF THE DISCLOSURE

Screening apparatus has a plurality of screen elements coaxially mounted on a rotatable shaft in spaced apart relation within a chamber into which flowable plastic substance is forced through each screen element into the space between the elements, thence to a main outlet, the screen elements having mesh screen clamped between main breaker plates and back-up breaker plates and there being separator bars interposed between the main breaker plates and having a wiping contact with the inner wall of said chamber, there being in some instances helical grooves in said wall leading from the space between the main breaker plates to the inlet and a back-flush for each screen element.

---

This invention relates in general to an apparatus for straining or screening flowable liquid or semi-liquid materials, such as synthetic plastic compositions, and more particularly the invention contemplates a screening head to receive a plastic substance from an extruder, screen the substance and deliver clean substance after screening thereof to an extruding die. In its broader aspects, the invention is directed to the use of one portion of a screening surface for normal straining and to simultaneously utilize another portion of the screening surface for removing the waste material and cleaning the screens. This broad concept is disclosed by the Burrell U.S. Patent No. 2,184,177 dated Dec. 19, 1939.

In the strainer apparatus of this general character, the screen is mounted on and to rotate with a shaft and a heavy end thrust is exerted on the shaft due to the pressure exerted in the screens by the substance being screened, and this has a tendency to limit the use of such devices to the screening of substances under relatively low pressure.

Primary objects of the present invention are to provide a screening apparatus of the general character described which embodies novel and improved features of construction whereby internal thrusts exerted on the screen unit are substantially balanced so as to eliminate all thrust tending to force the shaft or the screen unit in either of opposite directions; and thus to provide two spaced apart screen or strainer elements and means for directing the substance being screened from the inlet simultaneously through the two strainer elements into the space between them and thence to the outlet.

Further objects are to provide such a screening apparatus which includes novel and improved features of construction for back flushing and cleaning the strainer elements by causing a portion of the screened material to be drawn off or back-flushed through the strainer element at a certain point in the rotation of the strainer elements into an auxiliary outlet or side stream so as to back-flush the strainer elements while the other portions of the strainer elements are performing the screening operation and with a minimum of loss, for example less than one percent, of the strained substance; and to provide novel and improved means for controlling the rate of discharge of the waste material or substance.

Another object is to provide such a screening apparatus which shall include novel and improved means to prevent accumulation and stagnation of the substance being screened in the areas around the peripheries of the strainer elements.

Other objects of the invention are to provide a screening apparatus or a screening head for extruders which shall have larger available screening areas for a given overall external size of the apparatus, than is present in known screening apparatus of this general nature; and to obtain other advantages and results that will be brought out by the following description in conjunction with the accompanying drawings in which:

FIGURE 1 is a side elevational view of the screening apparatus or screening head for an extruder, embodying the invention;

FIGURE 2 is a top plan view thereof;

FIGURE 3 is an enlarged fragmentary central vertical sectional view approximately on the plane of the line 3—3 of FIGURE 1;

FIGURE 4 is a horizontal sectional view on the plane of the line 4—4 of FIGURE 3;

FIGURE 5 is an enlarged vertical view approximately on the plane of the line 5—5 of FIGURE 2; and FIGURE 6 is an exploded perspective view of the screening apparatus showing one head of the casing and the screening unit removed from the casing.

Specifically describing the illustrated embodiment of the invention, the apparatus or screening head comprises a casing that includes a main block A and lower and upper blocks B and C respectively. The main block has two coaxial cylindrical end portions 1 and 2. Into the cylindrical portion 1 is fitted the cylindrical body portion 4 of the upper end block C, and into the lower cylindrical portion 2 is fitted the cylindrical body portion 3 of the lower end block B; and the end blocks have the respective flanges 6 and 5 that are secured to the main casing block A by cap screws 7.

Within the main block A and between the end blocks B and C is formed a screening chamber generally designated D, and a substantially cylindrical screening unit E is rotatably mounted in said chamber on a shaft F that is journaled in the casing in suitable bearings G and H in the end blocks.

The screening unit is shown as comprising two screen or strainer elements I and J that are mounted coaxially on the shaft F in spaced apart relation along the axis thereof. Each screen element is shown as comprising a main breaker plate 8, a back-up breaker plate 9 and an annular mesh screen 10 clamped between the two breaker plates. The main breaker plates 8 are preferably integrally connected by a hub portion 8a so that the two plates in effect constitute spaced apart parallel flanges of spool-like structure that is keyed to the shaft F as by a key 8b. The main breaker plates have a plurality of screening orifices 11 in alignment with similar orifiecs 12 in the corresponding back-up breaker plates so that a flowable plastic substance may flow through said orifices and through the orifices or interstices in the mesh screens 10, between the outer end of each screen element and the inner end thereof and the space K between the strainer elements.

Preferably the back-up breaker plates 9 have outer cylindrical surfaces 13 that have a sliding engagement with the inner wall surface of the screen chamber, and, as shown, each back-up breaker plate preferably has an annular rabbett at its inner end into which fits the outer end of the corresponding main breaker plate and the edge portion of the corresponding mesh screen 10. Also, desirably there are separator or spacer bars 14 interposed between the screen elements and set into notches 15 in the breaker plates to interlock the plates in accurate relation and having arcuate outer surfaces concentric and flush with the outer surfaces 13 of the backup breaker plates to slidably contact and wipe the inner wall of the chamber D.

It is also desirable that the shaft F have a fixed collar 16 thereon on which rests the lower back-up breaker plate 9 so that the upper end block of the casing and the screen unit can be simultaneously lifted out of the main casing block A as shown in FIGURE 6 to facilitate assembly and disassembly, especially for interchanging and repair of the screen elements when desired.

Means are provided for feeding the substance to be screened to the outer ends of the screening unit and other means are provided for permitting a discharge of the screened substance from the space K between the screen elements to the point of use of the substance. Where the apparatus is used as a screening head for an extruder, an inlet opening 17 in one side of the main block is connected by a suitable adaptor 18, as shown in broken lines, to the outlet of an extruder, and a discharge opening 19 in the main casing block is connected by an adaptor 20, shown in broken lines, to an extruding die. The inlet opening 17 has two branches 17a and 17b that lead respectively to a feeding chamber 21 for the upper screen element and to a feeding chamber 22 for the lower screen element. These feeding chambers are partially formed by recesses in the end blocks and the respective ends of the screen unit, and they are arcuate and concentric with the screen unit.

The inner ends of the feeding chambers 21 and 22 are disposed at points distant from the feeding inlet branches 17a and 17b, and between the ends of these feeding chambers are the respective back-flush chambers 23 and 24 that are shown as approximately sector-shaped in plan and the areas of whose open ends are a small fraction of the area of the outer ends of the screen unit, as best seen in FIGURE 4. Leading from the back-flush chambers 23 and 24 are the respective auxiliary discharge ducts 25 and 26 which lead into the chamber 27 of a control mechanism for the rate of discharge of the waste substance. At the other end of the chamber 27 is a passage 28 that leads to a slide valve chamber 29 that has a discharge opening 31 and in which is a cylindrical slide valve 32 provided with longitudinal grooves 33 in its periphery whose inner ends are adapted to communicate with the passage 28 when the valve is in one position as shown in FIGURE 5 and to be cut off from said passage when the valve is moved into another position downwardly in FIGURE 5, so as respectively to permit and to prevent flow of the waste substance from the passage 28 outwardly through the discharge opening 31.

Mounted in the chamber 27 is a suitable means for retarding the flow of the waste material, and as shown there is provided a long pitch screw 34. The pitch and size of the screw may be selected to give the desired rate of flow under given conditions with the screw stationary, or the screw may be rotated either by hand or automatically to vary the rate of movement of the substance through the chamber. As shown, the screw is rotatably mounted in the chamber 27 and its outer end is journaled in a secondary casing 35 in which the passage 28 and the slide valve 32 are mounted.

As shown, the screw has an end portion 36 projecting from the secondary casing 35 and on which is secured a pulley 37 that is connected by belt 38 to another pulley 39 on a stub shaft 40 that is selectively connected to and disconnected from the output shaft 41 of a variable speed drive 42 by a suitable clutch mechanism generally designated 43. The variable speed drive 42 is connected to any suitable source of power, for example by a belt and pulley connection 44. The screen unit is driven from the variable speed device that has a connection with the lower end of the shaft F of the screen unit as best shown in FIGURE 1.

The invention also contemplates means for preventing accumulation of the plastic material in the crevises between the peripheries of the back-up breaker plates and the wall of the screening chamber. As shown, there is a helical groove 45 in the inner surface of the screening chamber D that underlies the periphery surface 13 of the corresponding back-up breaker plate. When the screen unit is being rotated during screening operation, there is a pump action in the grooves 45 that draws the clean or screened substance on the discharge or inner side of the main breaker plate toward the inlet side of the back-up breaker plate, thereby cleaning out this area, preventing stagnation and decomposition of the substance, and also preventing any leakage of dirty material through this crevis between the periphery of the back-up breaker plate and the inner wall surface of the screening chamber. The separator bars 14 at the same time wipe the plastic substance from the inner wall of the screening chamber to prevent accumulation or stagnation of the substance being processed.

Operation of the apparatus will be practically obvious from the foregoing. The material or substance to be screened is forced through the inlet passage 17, branches 17a and 17b and thence into the feeding chambers 21 and 22 while the screen unit is being rotated through the drive mechanism 44, 42. The pressure of the flowing substance is balanced at opposite sides of the screen elements so that there is a minimum end thrust on the screen unit and shaft F. The substance to be screened is forced through the screening orifices from the outer ends of screen elements to the inner ends thereof and into the space K between the screen elements from which the screened or cleaned material is forced outwardly through the discharge or outlet 19.

As portions of the screen elements come into register with the back-flush chambers 23 and 24, small quantities of the clean material are forced outwardly from the space K through the screening orifices to remove from the orifices and the mesh screen any dirty material, and the substance containing the dirty or waste material is forced through the auxiliary ducts 25 and 26 outwardly into the chamber 27. The rate of out-flow of the waste material is controlled by the device or screw 34 as well as by the slide valve 32 that may be manually or automatically operated through a lever 46 that may either be manipulated by hand or connected to some automatic control. As above indicated, the screw may be rotated and rotation thereof may be controlled by proper manipulation of the clutch mechanism 42.

Only a small quantity of clean substance is utilized in carrying the dirt away during the back-flushing operation, for example less than one percent of the clean material, and thus the screen elements may be continuously cleaned without materially reducing the overall output. Considering a screening head having a sixy (60) square inch area, approximately one pound of the clean material will provide a back-flushing operation if 100 percent efficiency in the flushing operation is assumed, but because such a high efficiency should not be assumed, we may assume that approximately two pounds of the substance will be used for one complete back-flushing cycle. Generally the screening unit will rotate about one revolution in ten minutes as a normal operating speed, and should it be desired to hold the change in output rate to a figure lower than one percent, the rotation of the screen unit can be reduced to, for example one revolution in a half hour.

The waste discharge may comprise a small extruder screw as shown in the drawings having a flat line for the pressure versus rate curve and discharging the waste material at a small but precise rate, and nevertheless, having a sufficient volume in the helix to eject from the mechanism any particles that are small enough to enter the back-up breaker plates orifices. For machines being used for the manufacture of pellets, a non-rotating screw device to serve as a generator of pressures drop ordinarily will be used.

It will be understood by those skilled in the art that the screening or cleaning operation can be controlled by a suitable timing mechanism to initiate a complete cycle at regular periods, for example every eight hours, or the operation can be controlled by the increase in pressure at the inlet side of the screen elements or control can be effected by a combination of both a timing mechanism and pressure. Where desired, manual operation is possible.

The start and stop clutch mechanism 43 will be of a type to avoid any sudden change in the production rate. A change of the speed in the drive unit 42 automatically brings about a change in the speed of the screening operation. The slide valve 32 will be closed when the extruder is not in operation so as to prevent leakage out of the system.

It will also be understood by those skilled in the art that the apparatus will be completely equipped with automatically controlled heaters to maintain the substance being screened at the proper consistency or viscosity for the screening operation.

While the now preferred embodiment of the invention has been illustrated and described, it will be understood that this is primarily for the purpose of illustrating the principles of the invention and that many modifications and changes may be made in the construction of the apparatus within the spirit and scope of the invention.

I claim:

1. Screening apparatus comprising a casing having an approximately cylindrical screening chamber therein, a screen unit including a shaft rotatably mounted in said casing coaxially with said chamber and a plurality of circular screen elements coaxially mounted on said shaft and spaced apart within said chamber along the axis thereof, each screen element having screening orifices leading from the outer end thereof to the inner end thereof into the space between said screen elements, said chamber having an inlet for feeding a flowable plastic substance to be screened to the outer end of each screen element and also having a main outlet for discharging screened substance from the space between adjacent screen elements, and means for rotating said shaft and screen unit, each screen element including a main breaker plate in opposed spaced relation to the main breaker plate of the other screen element, a back-up breaker plate and a mesh screen clamped between said main breaker plate and said back-up breaker plate, said main breaker plates are integrally connected by a hub portion keyed on said shaft, and separator bars interposed between said main breaker plates and having a slidable wiping contact with the inner wall of said screening chamber.

2. Screening apparatus comprising a casing having an approximately cylindrical screening chamber therein, a screen unit including a shaft rotatably mounted in said casing coaxially with said chamber and a plurality of circular screen elements coaxially mounted on said shaft and spaced apart within said chamber along the axis thereof, each screen element having screening orifices leading from the outer end thereof to the inner end thereof into the space between said screen elements, said chamber having an inlet for feeding a flowable plastic substance to be screened to the outer end of each screen element and also having a main outlet for discharging screened substance from the space between adjacent screen elements, and means for rotating said shaft and screen unit, each screen element including a main breaker plate in opposed spaced relation to the main breaker plate of the other screen element, a back-up breaker plate and a mesh screen clamped between said main breaker plate and said back-up breaker plate, the outer peripheries of said main breaker plates and said back-up breaker plates slidably contacting the inner wall of the screening chamber and helical grooves in the said inner wall in opposed relation to said peripheries of the breaker plates and leading from the space between said main breaker plates to said inlet.

References Cited

UNITED STATES PATENTS

| | | | |
|---|---|---|---|
| 1,585,817 | 5/1926 | Bailey et al. | 210—411 |
| 2,184,177 | 12/1939 | Burrell | 210—108 X |
| 2,858,941 | 11/1958 | Darnell | 210—393 X |
| 2,867,288 | 1/1959 | Turner | 210—225 X |
| 3,270,885 | 9/1966 | Anderson | 210—396 |
| 3,275,151 | 9/1966 | Carr | 210—333 |
| 3,288,293 | 11/1966 | Essel | 210—112 X |
| 3,146,494 | 9/1964 | Sponaugle | 210—411 X |

REUBEN FRIEDMAN, *Primary Examiner.*

D. M. RIESS, *Assistant Examiner.*